July 14, 1936.  H. H. TOMLINSON  2,047,602
TRUCK BODY
Filed June 6, 1935  3 Sheets-Sheet 1

Inventor
Henry H. Tomlinson,
By Mason & Mason
Attorneys

July 14, 1936.    H. H. TOMLINSON    2,047,602
TRUCK BODY
Filed June 6, 1935    3 Sheets-Sheet 2
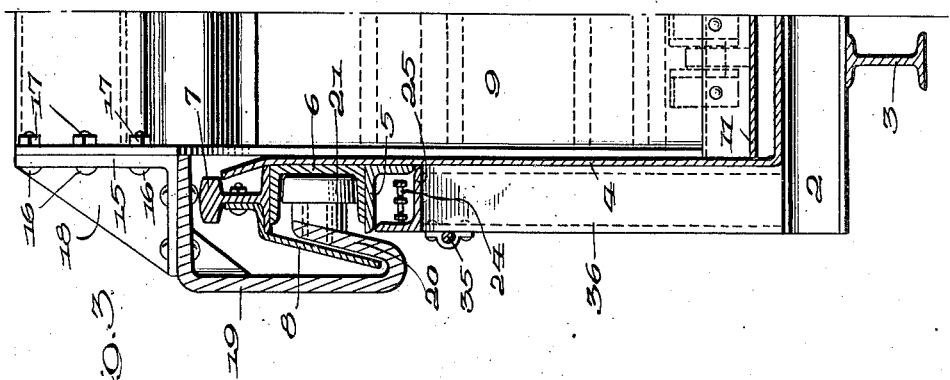
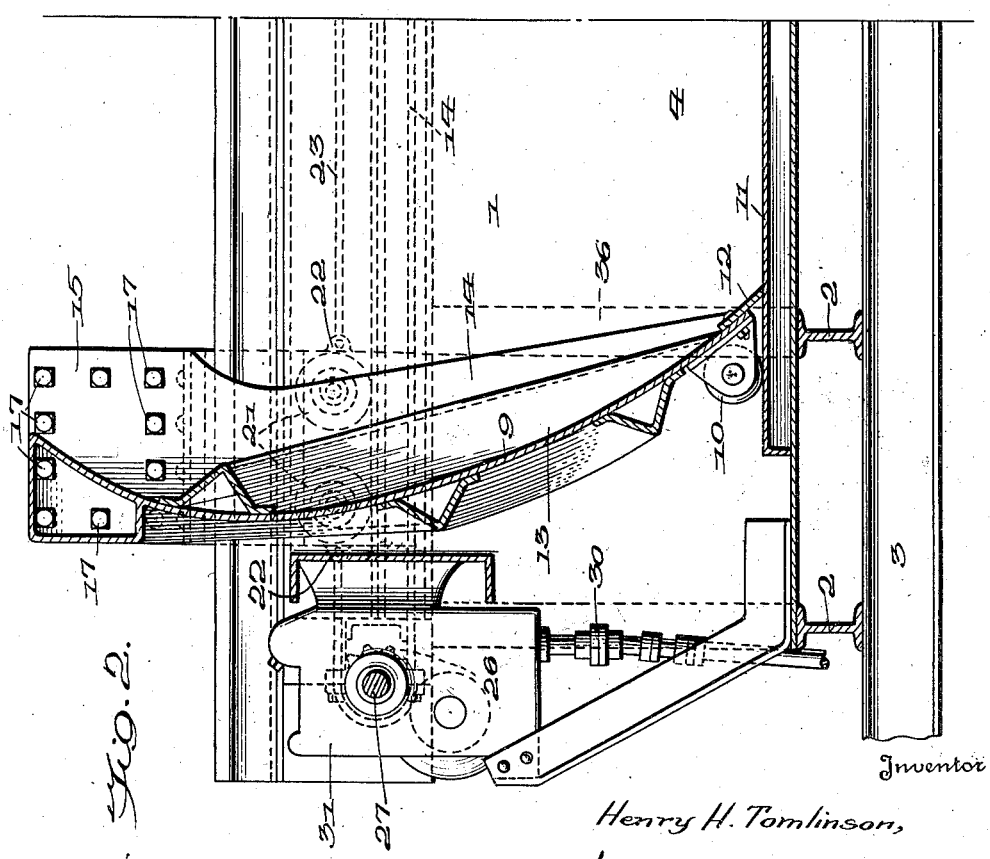
Inventor
Henry H. Tomlinson,
By Mason & Mason
Attorneys

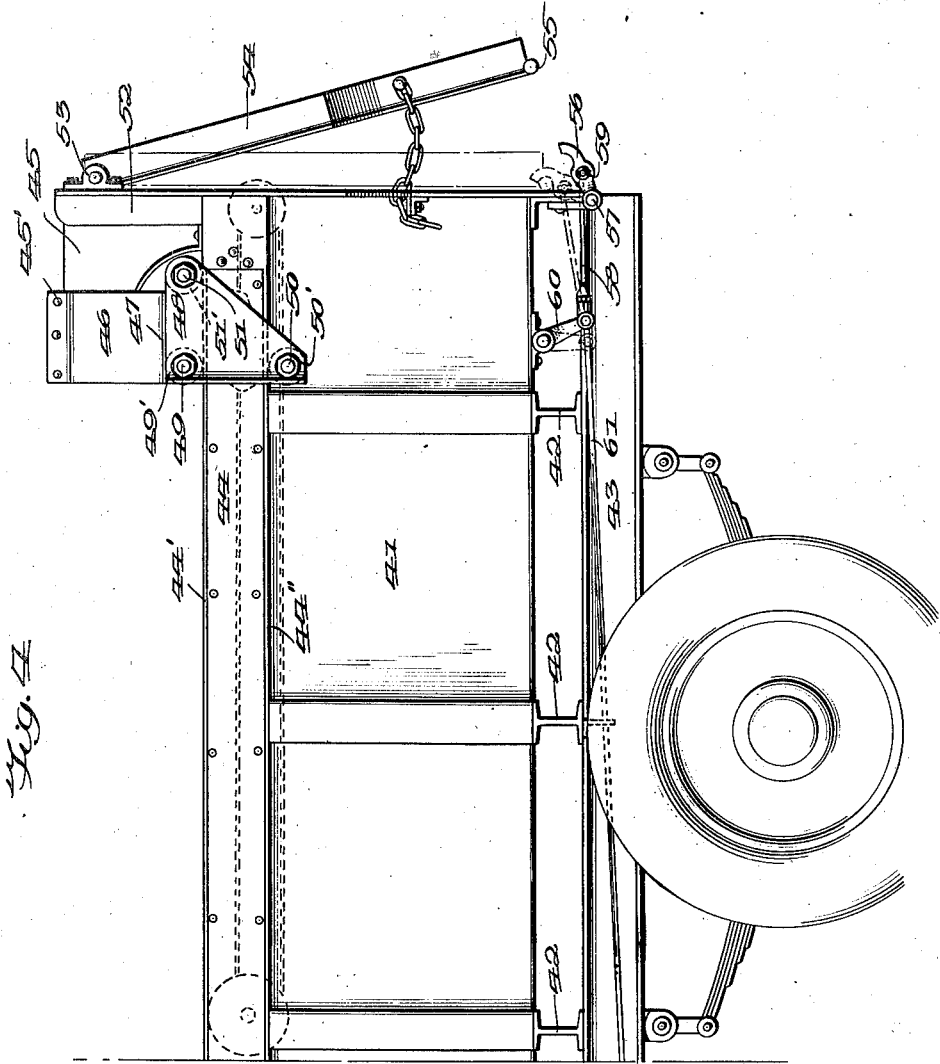

Patented July 14, 1936

2,047,602

UNITED STATES PATENT OFFICE 2,047,602

TRUCK BODY

Henry H. Tomlinson, Great Falls, Mont.

Application June 6, 1935, Serial No. 25,313

15 Claims. (Cl. 214—82)

This invention relates to a truck body preferably of the non-tilting type, (although this invention is not limited to a body which is rigidly mounted on the truck chassis), and wherein an end gate moves longitudinally from the forward to the rear end of the truck body to force the contents thereof out through the rear end of the truck body. The movable gate is actuated by power furnished from the motor of the truck.

In truck bodies of this type, it is of paramount importance that the movable gate be supported so as to move the load longitudinally of the body without subjecting the moving parts to undue stress, and with the least amount of torsional strain.

The principal object of this invention is therefore to so support the end gate mechanism that when this gate moves the load, the minimum amount of strain will be imposed on the moving parts. This object is obtained by the construction hereinafter described.

An object of the present invention is the provision of a truck body having a movable gate which is so supported as to evenly distribute the load to be moved over the entire surface of the gate.

A further object of the invention includes the provision of means for moving the end gate under load and applying the force for moving the gate substantially in a horizontal line with the center of the load to be moved.

Other objects will appear hereinafter throughout the specification.

In the drawings:—

Fig. 2 is a side elevation of the forward end of a truck body, certain parts being shown in section;

Fig. 3 is a transverse vertical view partly in section showing details of the means for mounting the movable gate and the supporting means therefor on the side wall of the truck body; and Fig. 4 is a side elevation of a modified dump truck body.

Figure 1:
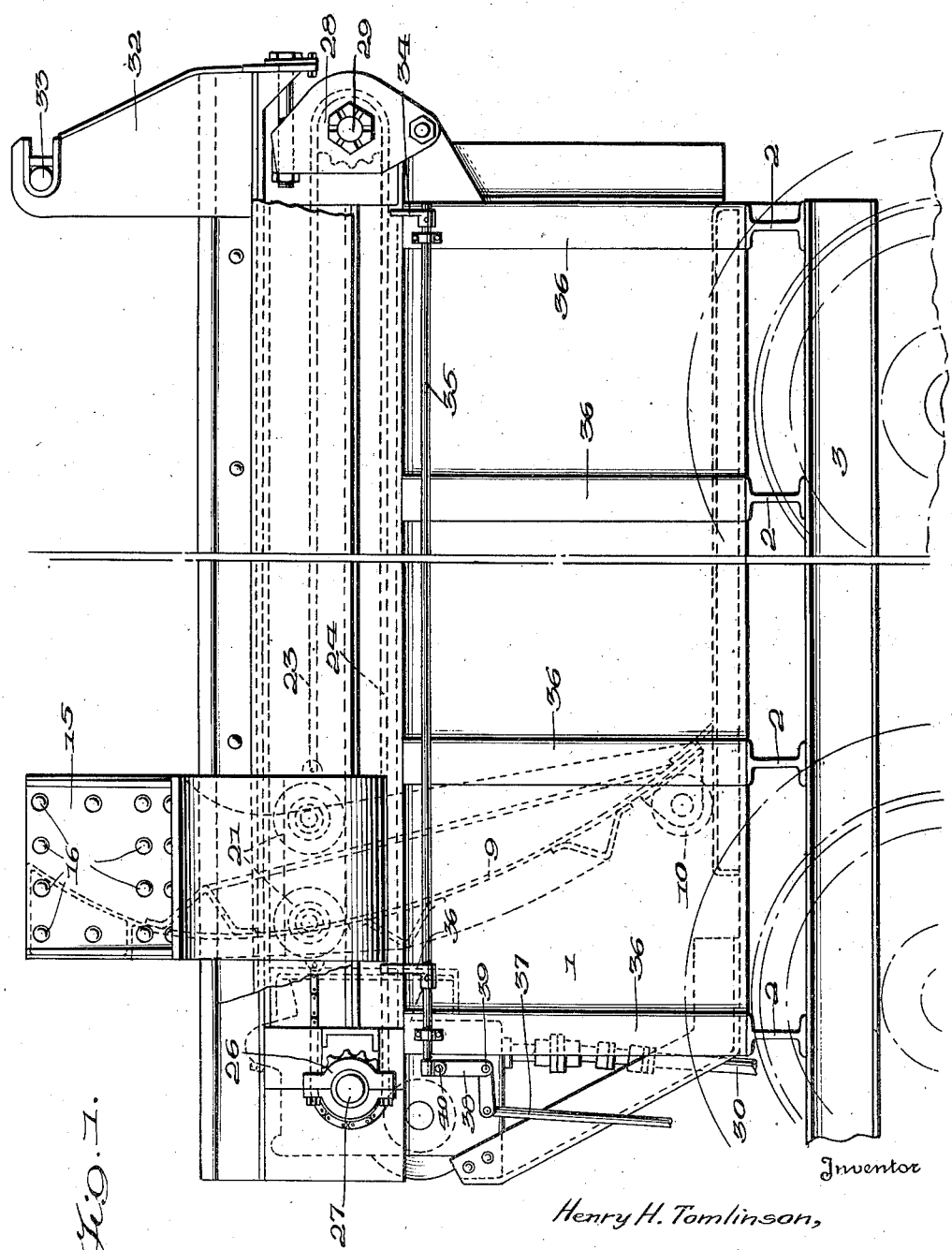
Fig. 1 is a side elevation broken away showing the forward and rear ends of a truck body embodying the present invention and the mechanism for actuating the movable gate.

In the drawings there has been shown a power take-off from the motor of the truck. Such power take-off is shown for illustrative purposes only, as it is to be understood that said power take-off may be the same as that shown, or a hydraulic power take-off such as a St. Paul hoist or a Woods hoist, or a worm screw drive may be used in the stead of that shown. None of these units involve any new principle of power-take-off.

The numeral 1 indicates the body of a dump truck which may be mounted upon a series of transversely extending I-beams 2 which are supported on beams 3 forming part of the chassis of the truck. Each of the side walls 4 of the truck are provided with flanged members indicated by the numeral 5, while above these are located channel members 6. In order to protect the sides of the truck body from injury when the truck is being loaded by a steam shovel, I have mounted on the channel members rigid beam members 7 preferably of steel which may be in the form of I-beams, or as shown, sections of track rails. Attached to these members 7 are skirt members 8 which protect the means for supporting the movable end gate hereinafter described.

Referring to Figs. 1 and 2, the numeral 9 shows the movable end gate positioned adjacent the forward end of the truck body and in such position as it will assume prior to moving the load of material out of the end of the truck body. The weight of the gate is partially supported by one or more rollers 10 that roll over the floor 11 of the truck body 1. The floor of the body 11 may be replaced by a new floor after the old floor has become worn out. Attached to the rear face of the movable end gate are one or more vertical ribs 13 intermediate the sides thereof, and located adjacent each of the side ends of the movable gate adjacent each side wall of the truck body is a larger vertically arranged rib member 14, and at the bottom is attached a scraper blade 12. Each side member is provided with a cutting edge and each moves along each side of the truck to scrape the material which may cling to the side as the gate moves from front to rear of the body to force the contents of the truck out of the rear end of the body on to the ground, road, or other surface on which it is desired to dump the material contained in the truck body. Preferably attached to these side rib members 14 and to that portion of them which extends above the truck body, are bracket members 15 which may be attached by screw threaded bolts indicated at 16 to nuts 17 to allow the removal of the movable end gate for replacement or repair. In order to make each bracket member 15 as strong as possible, said bracket member is braced by one or more gusset plates 18. Attached to the underside of the bracket member 15, by bolts or by welding, is a supporting bracket 19 which is so shaped at its side and upper portions as to clear the rail member 7 during the movement of the gate over said rail member. The lower portion of the bracket 19 has a turned-up portion 20 which forms a support for one or more bearings upon which are mounted travelling rollers 21, two of which are shown in dotted lines in Fig. 1. Connected to the front and rear edges of the turned-up portion 20, as at 22, are the upper runs of a chain 23, the lower run of this chain, as indicated at 24, being housed within the flange member 5, and an additional flange member 25, which is attached to the sides of the body. The links of the chain 23—24 mesh with a sprocket wheel 26 mounted on a shaft 27 adjacent the forward end of the body, and with a sprocket wheel 28 mounted on a shaft 29 adjacent the rear end of the body.

Any suitable means may be used so as to drive the shaft 27 as viewed in Figs 1 and 2, both in a clockwise and a counter-clockwise direction. Such means has been shown in these figures as a power take-off shaft 30 driven in any conventional manner from the power plant of the truck which drives the shaft 27 by means of gears, not shown, located in the gear box 31. The shaft may be driven either by forward and reverse gear driving mechanism located in the gear box 31, or in some instances, the shaft 30 may be connected so as to be driven by forward and reverse mechanism located adjacent to the point where power is taken off from the motor of the truck. All of these mechanisms are well known and no claim is herein made to the novelty of the same.

Mounted on each side of the truck body at or near the end thereof, is a bracket 32 which rotatably supports a shaft 33 upon which is pivotally mounted a tail gate. Said tail gate may be held in latched position by a mechanism such as that shown in Fig. 4. A rod 35 is mounted on the sides of the truck body in such manner so as to be slidably operated when the movable gate has reached the limits of its movement both at the forward and rearward ends of the truck body. To accomplish this automatic stoppage of movement there is mounted near or at the rear end of said rod an arm 34, and near the front end of said rod an arm 36. The front end of said rod is connected by a link 40 to a bell crank lever 38, pivoted at 39 and having its other end connected to a second rod 37, which rod when moved in either direction will disconnect the power by means of a suitable clutch which drives the shaft 30, thus discontinuing movement of the movable end gate. The supporting bracket 19 of the movable end gate serves as the means for actuating the arms 34 and 36 to automatically cause the gate to stop at either end of the truck body.

*Operation*

With the parts indicated in Figs. 1 and 2, the body of the truck is loaded with any suitable material by means of power shovels, or by other means, and the truck is used to transport the material to the place of deposit. The material may then be deposited while the truck is stationary, or as the truck moves over a surface, for instance, a road bed or base, upon which it is desired to deposit the material, such as mixed concrete, asphalt, etc. The operator of the truck, when the place of deposit has been reached, and either during the time when the truck is stationary or moving over a surface, now applies power to the shaft 30, which shaft drives the sprocket shaft 27 in a clockwise direction, as viewed in Figs. 1 and 2, thus causing the chain 23—24 to move the bracket 19, which is partially supported on one or more rollers shown which roll along the inside flange of the channel member 6, and by its connection with the gate, move the gate from the forward to the rear end of the truck, thus feeding the material uniformly out of the rear end on to the surface upon which it is desired to deposit the material.

The speed at which the movable gate 9 travels may be regulated either by controlling the speed of the truck engine, or by suitable change speed gear mechanism, not shown, and forming no part of the present invention.

It will be apparent that the force applied to the movable end gate is substantially at the horizontal center or a little above the center of the movable end gate. This application of power is obtained by its connection with the up-turned portion 20 of the bracket 19.

It will be further apparent that, due to the great weight of the load, and the stationary sides and bottom of the body, it is necessary to apply this power at such a point so as to prevent undue stresses or strains being placed upon the parts which are connected to and move with the chain in its forward and rear motion. After the gate has moved to the rear end of the truck, and the load has been removed from the truck body, the power is applied so as to reverse the direction of movement of the chain, which will cause the movable end gate to retrace its movement to the point shown in Figs. 1 and 2, whereupon the power is disconnected and the truck is now in a position to receive another load of material to be moved.

All of the channel members and brackets which are attached to the body, as well as the vertical brace members, and the I-beams or other supporting members upon which the body is mounted, are rigidly connected to the body by welding or by any other suitable means well known in the art. Similarly, the parts 19 and the brackets which connect the movable gate to the member 19 may be welded, bolted, or riveted to each other. While it is preferable to bolt the movable gate to the bracket to which it is attached in order to allow removal for replacement or repair, I do not wish to be limited to this construction, as these parts may be welded together or attached by any other suitable means which is found to be practical and expedient for the proper construction and operation of these parts.

The starting and stopping of the movable end gate may be accomplished simply by starting and stopping of the truck motor after the gate driving mechanism, or, said gate may be started in the manner above described and stopped at either end of the truck body by the mechanism shown in Fig. 1, it being understood that the lever 37 is connected to a suitable clutch, the clutching parts of which are in driving relation when the rod 35 is in a center position, but which will allow the "kicking" out of the clutching parts when the rod is moved away from a central position in either direction, as actuated by the bracket 19. The construction of such a clutch is well known in the prior art and no claim is made to the same herein per se.

That form of my invention illustrated by Fig. 4 includes a body 41 mounted on transversely arranged I-beams 42 which are arranged in spaced relation on the chassis members 43. The numeral 44 indicated I-beam members or channel members having upper and lower flanges 44' and 44". All of the above mentioned parts are preferably attached in the relation shown by welding, although other suitable means may be substituted for welding. A movable gate member similar to the gate member shown in Fig. 1 is indicated by the numeral 45. This member is attached preferably by removable means 45', such as bolts, to opposite plate members 46 located adjacent and above the side members of the body 41, or in similar relation to the bracket members 15 of Fig. 1. These plate members are preferably welded along the line 47 to supporting bracket members 48, which are of general triangular configuration, and serve to support shafts 49, 50, and 51, which shafts extend through the plate 48 and are held on said plate by nuts which are screw threaded onto the several shafts. 49', 50' and 51' are rollers which support the gate in movable relation on the upper and lower flanges 44' and 44" of the I-beam or channel member 44, said rollers being mounted on the shafts 49, 50 and 51.

The numeral 52 indicates an angle member which is welded or otherwise attached to the rear side of each of the truck body sides. There are two of these members 52, one attached to each side of the body member at the rear end thereof. A shaft 53 is mounted near the upper end of the members 52 and serves to pivotally support a tail gate 54. A cylindrical rod 55 is located at the lower end of the tail gate. There is a latch indicated by the numeral 56, pivoted at 57 to the body. An actuating rod 58 is attached at 59 to the latch. Said rod 58 and the rod indicated at 61 are suitably supported by a hanger 60, and the rod 61 is actuated by a lever or other means not shown, located in the driver's cab. When the mechanism which actuates the movable gate 45 is set in motion at the forward end of the body to force the load of material out the rear end of the truck, said rod 61 is moved rearwardly from the dotted line position to the full line position, thus releasing the tail gate 54 and allowing the same to pivot as the load is forced out.

The supporting bracket 48 may have chains attached to the side thereof and be operated in a similar manner as in the preferred form of my invention disclosed by Figs. 1, 2 and 3. However, it may be desirable to use on the lighter form of truck body, as disclosed in Fig. 4, a cable and drum arrangement indicated in dotted lines on Fig. 4. The operation of the drum indicated at the left hand of the figure may be accomplished by rotating the same in either direction by any suitable means such as the means shown in Figs. 1 to 3 for operating the shaft 27, or by other mechanism.

The principal difference in that form of my invention illustrated in Fig. 4 from the form shown in the other figures, is the mounting of the rollers which support the movable gate member so that two of said rollers rotate on top of the upper flange 44', while the lower roller rotates underneath the lower flange 44". The principal function of the lower roller 50' is to prevent tipping of the gate 45 and the parts connected thereto, while forcing the load of material out of the end of the body. The principle of supporting the movable gate is the same as that shown in the other figures and accomplishes the same result, viz., the force for moving the gate is applied substantially at the horizontal center or a little above the horizontal center of said gate. The mechanism disclosed in Fig. 4 is particularly adapted for use with smaller types of dump bodies. Considerable economy in cost of construction is obtained over that form shown in Figs. 1 to 3.

Having illustrated a typical embodiment of my invention by describing the construction and the operation thereof, it is to be understood that various changes in design and methods of operation may be made by those skilled in the art, without departing from the principles of my invention, and therefore, it is to be understood that the foregoing description is to be considered illustrative of the broader claims appended herewith.

What I claim is:—

1. A dump truck body, a gate movable longitudinally of said body, brackets mounted on said gate adjacent the top thereof, and flexible means attached to said brackets for moving said gate from the front to the rear end of said body and for moving said gate in the opposite direction, said flexible means being located entirely outside of the load carrying area of said body whereby said flexible means remains out of contact with the load during removal of the load from said body, and means for driving said flexible means, there being cooperative means on said brackets and body and located between the same for preventing vertical movements of said gate and for relieving torsional strains.

2. A dump truck body, a gate movable longitudinally of said body, brackets mounted on said gate adjacent the top thereof, flexible means attached to said brackets for moving said gate from the front to the rear end of said body, means for driving said flexible means, and roller means attached to said brackets for supporting said brackets and gate and supported on the upper sides of said dump truck body, the outer sides of said body having means cooperating with said roller means for preventing vertical movements of said gate and for relieving torsional strains during driving movements of said gate.

3. A dump truck body, a movable gate adapted to move back and forth in said body to move the load out of the rear end of said body, brackets attached to said gate and extending over the upper edges of the sides of said body there being cooperative means on said brackets and body and located between the same for preventing vertical movements of said gate and for relieving torsional strains, means attached to said brackets for moving the same and said gate attached thereto, and means for driving said last named means.

4. A dump truck body, a movable gate adapted to move back and forth in said body to move the load out of the rear end of said body, brackets attached to said gate and extending over the upper edges of the sides of said body, chain means attached to said brackets for moving the same and said gate attached thereto and means for supporting said chain means outside of the load carrying area of said body whereby said chain means remains out of contact with the load carrying area of said body, and means for driving said chain means, there being cooperative means on said brackets and body and located between the same for preventing vertical movements of said gate and for relieving torsional strains.

5. A dump truck body, a movable gate adapted to move back and forth in said body to move the load out of the rear end of said body, brackets attached to said gate and extending over the upper edges of the sides of said body, means attached to said brackets for moving the same and said gate attached thereto, means on the sides of said body for supporting said brackets and at least a portion of the weight of said gate, said means being located adjacent the upper outside portions of the sides of said body, and means for driving said first named means, there being cooperative means on said brackets and body and located between the same for preventing vertical movements of said gate and for relieving torsional strains.

6. A dump truck body, a movable gate adapted to move back and forth in said body to move the load out of the rear end of said body, brackets attached to said gate and extending over the upper edges of the sides of said body, chain means attached to said brackets for moving the same and said gate attached thereto, means for driving said chain means, and means on the sides of said body for supporting said brackets and a portion of the weight of said gate, said means being located adjacent the upper outside portions of the sides of said body, there being cooperative means on said brackets and body and located between the same for preventing vertical movements of said gate and for relieving torsional strains.

7. A dump truck body, a shaft mounted adjacent the forward end of said body, and a shaft mounted adjacent the rear end of said body, sprockets on said shaft, a chain trained over said sprockets, a member having a channel portion in which one run of said chain is adapted to travel, a bracket adapted to move with said chain, rollers on said bracket, said rollers being supported on one flange of said channel portion, a gate attached to said bracket member and adapted to move therewith, and means for moving said chain in a plurality of directions whereby said gate may move from front end to the rear end of said body and return to the front end thereof, and another flange of said channel portion cooperating with said rollers to thereby prevent vertical movements of said gate and for relieving torsional strains during driving movements of said gate.

8. A dump truck body, a shaft mounted adjacent the forward end of said body, and a shaft mounted adjacent the rear end of said body, sprockets on said shaft, a chain trained over said sprockets, a member having a channel portion in which one run of said chain is adapted to travel, a bracket adapted to move with said chain, rollers on said bracket, said rollers being supported on one flange of said channel portion, a gate attached to said bracket member and adapted to move therewith, means for moving said chain in a plurality of directions whereby said gate may move from the front end to the rear end of said body and return to the front end thereof, said bracket means being attached adjacent the top sides of said movable gate and above the top of the truck body, and another flange of said channel portion cooperating with said rollers to thereby prevent vertical movements of said gate and for relieving torsional strains during driving movements of said gate.

9. A dump truck body, a gate movable longitudinally of said body, brackets mounted on said gate adjacent the top thereof, a member having a channel portion mounted above the side of said body, said channel portion including an upper and a lower flange member, a plurality of rollers mounted on said bracket, certain of said rollers being mounted to roll on the upper portion of said upper flange member, and certain of said rollers being mounted to roll on the lower er portion of said lower flange member, and means for applying force to move said gate in a line 10. A dump truck body, a gate movable longitudinally of said body, brackets mounted on said gate adjacent the top thereof, a member having a channel portion mounted above the side of said body, said channel portion including upper and lower flange members, a plurality of rollers mounted on said bracket, certain of said rollers being mounted to roll on the upper portion of said upper flange member, and certain of said rollers being mounted to roll on the lower portion of said lower flange member, and means for applying force to move said gate in a line substantially at the center of said gate, said bracket member having the shape of an inverted triangle, the inverted apex of which supports said roller which rolls on said lower flange member.

11. A dump truck body, a gate movable longitudinally of said body, brackets mounted on said gate adjacent the top thereof, a member having a channel portion mounted above the side of said body, said channel portion including upper and lower flange members, a plurality of rollers mounted on said bracket, certain of said rollers being mounted to roll on the upper portion of said upper flange member, and certain of said rollers being mounted to roll on the lower portion of said lower flange member, and means for applying force to move said gate in a line substantially at the center of said gate, said bracket member having the shape of an inverted triangle, the inverted base of which supports at the corners thereof the rollers which roll upon the upper flange member.

12. A dump truck body, a gate movable longitudinally of said body, brackets mounted on said gate adjacent the top thereof, a member having a channel portion mounted above the side of said body, said channel portion including upper and lower flange members, a plurality of rollers mounted on said bracket, certain of said rollers being mounted to roll on the upper portion of said upper flange member, and certain of said rollers being mounted to roll on the lower portion of said lower flange member, and means for applying force to move said gate in a line substantially at the center of said gate, said bracket member having the shape of an inverted triangle, the inverted apex of which supports at the corners thereof the rollers which roll upon the lower flange member.

13. A dump truck body, a movable gate adapted to move back and forth in said body to move the load out of the rear end of said body, brackets attached to said gate and extending over the upper edges of the sides of said body, means attached to said brackets for moving the same and said gate attached thereto, means on the sides of said body for supporting said brackets and at least a portion of the weight of said gate located adjacent the upper outside portions of the sides of said body, and means for driving said first named means, said first named means being attached to said brackets adjacent to said supporting means, there being cooperative means on said brackets and body and located between the same for preventing vertical movements of said gate and for relieving torsional strains.

14. A dump truck body, a movable gate adapted to move back and forth in said body to move the load out of the rear end of said body, brackets attached to said gate and extending over the upper edges of the sides of said body, means for supporting said brackets and at least a portion of the weight of said gate located outside of the load carrying area of said body, and means for driving said brackets and said gate attached thereto, there being cooperative means on said brackets and body and located between the same for preventing vertical movements of said gate and for relieving torsional strains.

15. A dump truck body, a movable gate adapted to move back and forth in said body to move the load out of the rear end of said body, brackets attached to said gate and extending over the upper edges of the sides of said body, means on the sides of said body for supporting said brackets and at least a portion of the weight of said gate located outside of the load carrying area of said body, and means for driving said brackets and said gate attached thereto, there being cooperative means on said brackets and body and located between the same for preventing vertical movements of said gate and for relieving torsional strains.

HENRY H. TOMLINSON.